Figure 1:
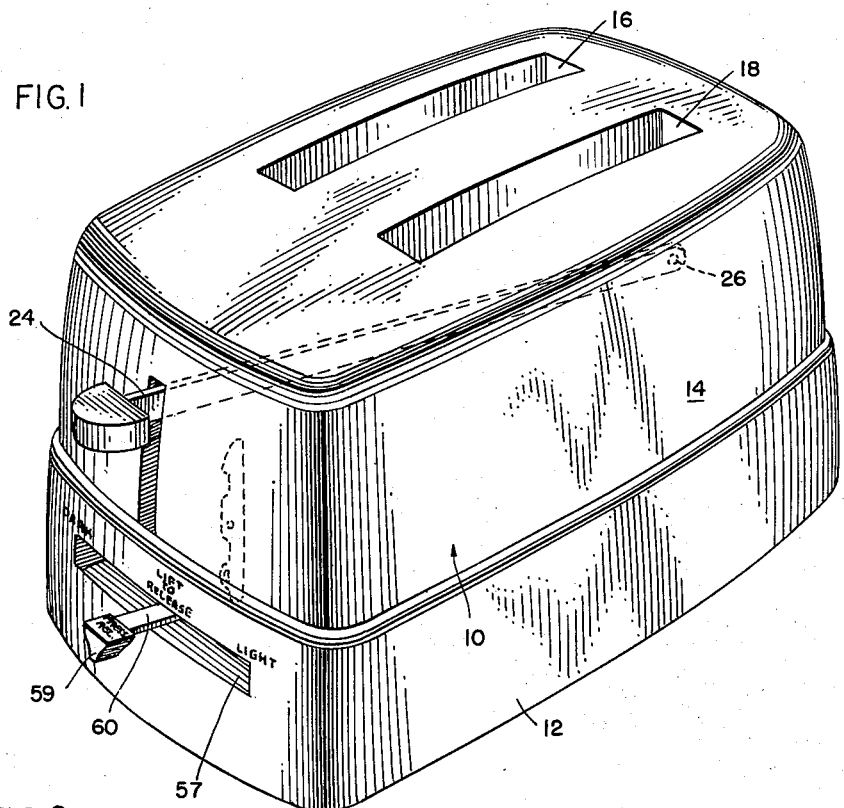

Sept. 29, 1959　　　A. E. SCHWANEKE　　　2,906,194

TIMER MECHANISM

Filed June 7, 1956

INVENTOR:
ALFRED E. SCHWANEKE
BY
ATTORNEY

United States Patent Office 2,906,194
Patented Sept. 29, 1959

2,906,194

TIMER MECHANISM

Alfred E. Schwaneke, Northbrook, Ill., assignor to Dormeyer Corporation, Chicago, Ill., a corporation of Illinois Application June 7, 1956, Serial No. 590,001

5 Claims. (Cl. 99—329)

This invention relates to a new and improved automatic toaster and more particularly to a toaster in which the release mechanism is brought into operation by heat from the surface of the bread being toasted as a result of a series switch arrangement which will insure uniform operation of the device with a minimum of parts.

Arrangements for providing a cycle for toasting a piece of bread in response to sensible heat in the toasting compartment remaining from previous toasting cycles have heretofore been available, but the timing cycles in such mechanisms have failed to provide for voltage variations; were unable to reheat cold toast without changing its color or burning it; did not maintain toast uniformity with bread slices of varying kinds of moisture content; incurred gradual deviation or creep from a set relationship due to load strains on bi-metal members; burned the toast and became a fire hazard if the toast carriage failed to rise; and were unsafe from an eelctric shock viewpoint when not toasting. Likewise inspection of the toast during the toasting period changed the toasting results expected for the toast inspected and when a piece of toast was removed before the end of the cycle, the cycle had to be completed in many cases before the next toasting period could be initiated.

It is therefore an object of the present invention to provide a new and improved electric toaster of a fully automatic type, which nevertheless can be manually actuated when desired.

Another object is to provide a toaster which will produce uniform toast regardless of wide variations in line voltages and power factor.

Another object is to provide a toaster which will function to produce uniform toast through repeated toasting cycles regardless of the moisture content found in the bread.

Another object is to provide a toaster which may be used to reheat cold toast automatically without burning or darkening of the toast.

Another object is to provide a toaster in which the release is put into operation by heat transmitted from the toast surface independently of any timing relationship such as has heretofore been required.

Another object is to provide a toaster which is substantially independent of complicated spring actuating means and which utilizes a pair of switching elements in series to achieve sensitive response to the heat in the bread for terminating a cycle.

Another object is to provide electromagnetic means acting directly on a latch member for releasing a lever whose basic function is to trigger the toast release mechanism, said electromagnetic means being responsive to closing of two switches in series.

Another object is to provide a device of the type indicated which may be calibrated initially by set screw means in a pin assembly adapted to determine the setting of one of the switching elements and also by an angularly adjustable lever, thereby affording two distinct but coacting modes of determining the lightness or darkness of the toast to be produced.

Another object is to provide adjustment means of the type described wherein no strain on the pin assembly is produced in actuating the manual means for calibration.

Another object is to provide simple and effective means for actuating a toast releasing mechanism wherein the number of parts are reduced to a minimum over those heretofore required.

Figure 2:
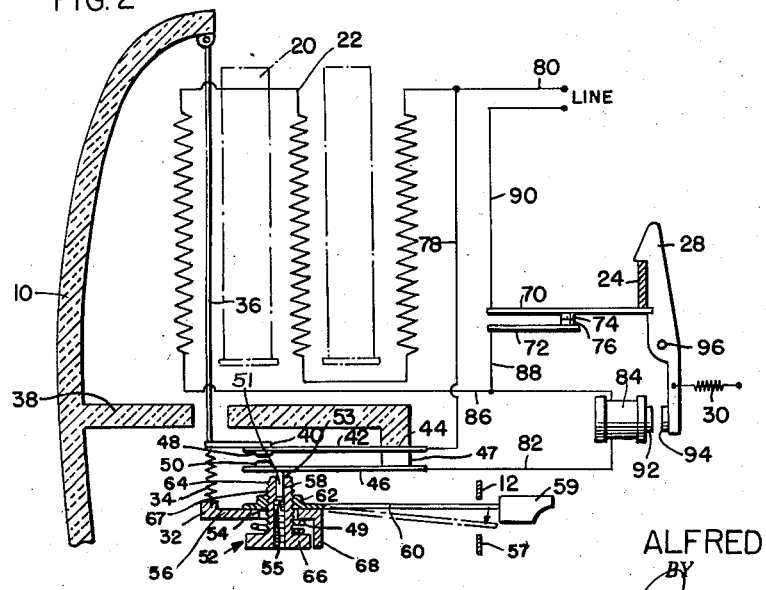

Referring now to the drawings:

Fig. 1 is a perspective view of a toaster according to the present invention; and Fig. 2 is a vertical sectional view in diagrammatic form of the electrical circuit for use in the toaster of the invention.

Referring now to Fig. 1, a toaster 10 according to the invention is shown, which is provided with a lower housing member 12 and an upper housing member 14 secured to the lower housing member and defining the usual openings 16 and 18 in its upper surface for introduction and removal of bread to be toasted.

The housing thus formed supports a plurality of generally similar heating elements 20 as seen diagrammatically in Fig. 2 which consist of resistance wire 22 wound preferably on mica, it being appreciated that spun glass or asbestos sheets can be used for the same purpose if desired. Bread slices may thus be lowered between pairs of the heating elements 20 and are held in spaced relation to the elements 20 by the usual crimped wires (not shown).

In order to provide for raising or lowering the toast in the toaster manually, a lever 24 extends through the center of the toaster between intermediate heating elements 20 and has its inner end pivoted at 26 to a suitable frame member in the toaster (not shown), it being understood that a corresponding lever may be provided for the other end of the toaster; likewise, suitable intermediate linkages are provided (not shown) for connecting the carriages on which the toast is supported to the lever 24, it being understood that these carriages may be of a standard construction adapted to be biased upwardly by suitable spring means (not shown).

In order to retain the toast in position for toasting, a latch 28 is provided adapted to engage lever 24 as shown, which is releasable when the temperature of the bread being toasted reaches a predetermined level as will be hereinafter set forth, the latch being biased counterclockwise by a spring 30. The mechanism for releasing the latch 28 includes a support frame 32 provided with a tension spring 34 adapted to hold under tension a wire 36 which is made of a metal having a relatively high coefficient of heat expansion so as to be elongated by an increase of heat radiated from a slice of bread adjacent thereto. The wire 36 replaces one of the usual crimped wires for keeping the bread spaced from the heating element.

The wire 36 is preferably adapted to extend through a platform 38 in the housing 12 and has affixed to the lower end thereof a bar 40 carrying a switchblade 42 which is mounted at its other end on a depending lug 44 of the platform 38 for pivotal movement as actuated by the wire 36. A switchblade 46 is secured to the lug 44 in parallel and axially aligned relation beneath switchblade 42 and spaced from the blade 42 by suitable insulating washers 47. In order to provide a switch means, the blade 42 carries a contact 48 disposed in normally spaced relationship to a contact 50 on the bar 46.

Whereas the angular disposition of the switchblade 42 is determined by the wire 36 as tensioned by spring 34 secured to the support frame 32, the position of the switchblade 46 is determined by a pin assembly 52 which is supported on the frame member 32 in an aperture 54 defined by a shelf 56 of the frame 32.

An exceptionally reliable calibration is afforded by the assembly 52, and to this end an externally threaded bolt 58 extends through the aperture 54 and is supported by an angularly adjustable lever 60 bearing on the upper surface of the shelf 56, the lever 60 being provided with a boss 62 in which is threaded the upper shank 64 of the bolt 58. In order to restrain bolt 58 against rotation, a head 66 is formed at the lower end thereof, with a preferably square configuration, and a depending flange 68 integral with the shelf 56 extends into abutting relation with one edge of the head 66.

The bolt 58 is held in predetermined axial alignment with the shelf 56 and in desired position relative to the blade 46 by means of a helical spring disposed concentrically on the shaft 64 with the lower end thereof bearing on the head 66 and the upper end bearing against the support frame 92. Thus, the shaft or lever 60, and particularly the boss 62 thereof engages firmly against the shelf 56 so that the position of the bolt 58 will not be changed accidentally.

Adjustment contact with the blade 46 is made by a refractory pin 51 formed of any suitable temperature resistant ceramic material or the like, and supported in predetermined axial alignment in a bore 53 defined in the bolt by means of a set screw 55 which is threadedly received within the bore 53 for adjustment by an Allen wrench or the like.

The angular position of the blade 46 relative to the horizontal plane is thus determined initially by the axial position of the set screw 55 in the bolt 58, but it may be readily adjusted by manual operation of the lever 60. This latter adjustment is accomplished by rotation of the lever 60 in a relatively wide slot 57 defined in the housing 12.

Referring to Fig. 1, it will be seen that the housing 12 is provided with indicia along the slot 57 so that the lever 60 may be disposed in registration with any of a plurality of indicia for making light or dark toast selectively, the lever being provided with a suitable handle 59 for this purpose.

Rotation of the lever 60 thus causes the bolt 58 to move axially upwardly or downwardly, depending on the direction of movement of the lever. Because there is no rigid connection between the lever and the shelf support, it is possible for this adjustment to be made without any distortion or strain of the pin assembly 52; and likewise the pin 55 itself may be varied in its position relative to the bolt 58 by means of set screw 51 without stress being imparted to any element of the thermostatic control.

The switching means provided by the blades 42 and 44 and their contacts 48 and 50 is connected in series with a second switching means comprising a pair of spring blades 70 and 72 carrying contacts 74 and 76, in such a manner that the heating elements will be energized when the first switching means is open and the second is closed, but which will be deenergized upon closing of the first switching means. Thus a line 78 connects blade 42 of the first means to a line 80 leading from resistance wires 22 to a suitable socket for the toaster, but the line 82 for blade 46 leads to an electromagnet 84 which is connected to the other end of wire 22 by a line 86.

Thus, the first switch and the electromagnet 84 are in parallel with the basic circuit represented by wires 22 and for which the switch represented by blades 70 and 72 is the on-off mechanism or circuit breaker, the line 88 and line 90 for blades 70 and 72 respectively providing the other line for the outlet connections.

When the first switch is open, and contacts 48 and 50 are separated, the spring 30 will hold the bar 24 down and maintain the second switch closed with contacts together. However, closing of the first switch serves to energize the magnet 84 and to cause a metallic stop 92 on the magnet to pull metal stop 94 on the latch 28 into contact therewith against the spring 30 to release the bar 24 and break contact between contacts 74 and 76 as the latch pivots around a pivot point 96. The blade 70 is preferably biased upwardly for this purpose.

Suitable linking means (not shown) are provided to pivot the latch member 28 into engagement with the bar 24 when the toaster is put in operative position by insertion of a plurality of individual pieces of toast thereinto, and thereby energize the circuit by bringing the contacts 74 and 76 together to initiate a toasting cycle. At such time, the wire element 36 will be at normal length and will hold the switchblade 42 in relatively elevated position with the contact 48 in spaced relation to the contact 50. However, as the heat from the heating elements 20 creates an increasingly high temperature in the toast, the wire 36 will lengthen progressively, as held under slight tension by the spring 34. Ultimately, when the toast is at a temperature corresponding to a desired color thereof, as determined by the set screw 55, and in particular lever 60, the blade 42 will be turned downwardly sufficiently to bring the contacts 48 and 50 together. Thus, the switching elements provided by these contacts and contacts 74 and 76, which are in series, will be closed to complete the circuit for the electromagnet 84. Thus the moment that the contacts 48 and 50 come together, the energization of the electromagnet will pivot latch 28 into release position, as described. Thereupon the toast will be ejected or raised to position where it is accessible for removal, and the contacts 74 and 76 will again be positioned in spaced-apart relation by the upward movement of the bar 70 therefore held in contact position by the lever.

It will therefore be seen that the means for releasing the bar 24 and for deenergizing the circuit are extremely simple and require no other moving parts but the actual control blades 42 and 70 and latch 28. Thus, the construction represents a marked reduction in the number of parts required by devices heretofore, and in the complexities of their mode of operation.

However, should it be desired to operate the release mechanism manually this can be readily accomplished by the novel construction of the manually operable lever 60. In addition to its ability to adjust the calibration of the thermostatic pin assembly 52 by horizontal rotation, the lever 60 may be used to make the contact between contacts 48 and 50 by movement in the vertical plane, as indicated in Fig. 2. As heretofore described, there is no rigid connection between the lever 60 and the bolt 58, and the shelf 56. Consequently, when the lever 60 is moved downwardly by manually pressing the handle 59, it will fulcrum on the corner of the shelf 56 defined by the shelf and the depending flange 68 which prevents rotation of the bolt 58. The shelf 56, and the length of the lever 60 may be varied dimensionally to change the leverage thus produced, and it will be apparent that but slight pressure is required to place the contacts 48 and 50 into circuit making position, thereby completing the circuit for the magnet 84 and effecting clockwise pivotal releasing action of the latch 28.

As stated the elongate horizontal slot 57 is of a relatively great width so as to afford adequate leeway for the described vertical angular movement of the lever 60 in any position along the length of the slot. Accordingly, the manual release is not dependent on a certain position of the lever 60 or a particular initial calibration of the thermostat elements themselves. This manual energization of the magnet thus has the great advantage of permitting immediate interruption of the cycle and removal of the toast at any time desired, as for example in the event that the toast is burned because an unusually irregular configuration thereof or for any other reason.

In actual use the refractory pin 51 will generally be set at a predetermined level where it extends above the end of the shank 64 a slight amount as determined by adjustment of the set screw 55. Thereupon the operator can vary the setting of the thermostatic control by movement of the lever 60 as he becomes acquainted with the degree of toasting produced by the initial calibration to either produce a lighter or a darker toast as desired. The lack of moving parts will result in substantially lower repair and replacement costs as well as an initial lowered manufacturing cost, so that in addition to the advantages of freedom from dependency on timing cycles of the toaster, the device will be very competitive with the constructions heretofore available which are not adapted to respond to the sensible heat of the toast.

Although I have herein set forth and described my invention with respect to certain specific embodiments and certain details and principles thereof, it will be understood by those skilled in the art that these may be varied as desired within the scope of the invention without departing from the spirit and scope thereof as set forth in the hereunto appended claims.

I claim:

1. In a toaster, a circuit including a heating element, a switch comprising a pair of blades each having a contact, one of said blades being biased away from the other of said blades, a manually operable lever adapted to close said switch by moving said one blade into contact with said other blade, a latch biased to engage said lever in its switch closing position, electromagnetic means adapted to pivot said latch out of engagement with said lever when energized, an additional switch comprising a pair of blades each having a contact, one of said blades being biased away from the other of said blades, said additional switch and said electromagnet being in series with said first-named switch, a rod of metal having a relatively high coefficient of heat expansion and responsive to sensible heat in toast which may be toasted in said toaster to close said additional switch when said rod is expanded longitudinally a predetermined amount, said electromagnetic means being adapted to be energized when said first and second switches are closed, a pin assembly including an externally threaded bolt having a head at the lower end thereof, a frame in said toaster having a shelf defining an aperture for receiving said bolt therethrough, a lever having said bolt threadedly received therein at one end thereof and bearing against said shelf to support said bolt, a helical spring being disposed between said head and said shelf and a depending flange on said shelf adapted to engage said head to prevent rotation of said bolt when said lever is turned manually axially of said bolt whereby to adjust the setting of said additional switch.

2. In a toaster, a circuit including a heating element, a switch comprising a pair of blades each bearing a contact, said blades being biased apart, a manually operable lever adapted to close said switch, a latch biased to engage said lever in a switch closing position thereof, electromagnetic means adapted to pivot said latch out of engagement with said lever when energized, an additional switch comprising a pair of blades each bearing a contact, said blades being biased apart, said additional switch and said electromagnet being in series with said first-named switch, a rod of metal having a relatively high coefficient of heat expansion and responsive to sensible heat in toast which may be toasted in said toaster to close said additional switch when said rod is expanded longitudinally a predetermined amount, said electromagnetic means being adapted to be energized when said first and second swtches are closed, a pin assembly including an externally threaded bolt having a head at the lower end thereof, a frame in said toaster having a shelf defining an aperture for receiving said bolt therethrough, a lever having said bolt threadedly received therein at one end thereof and bearing against said shelf to support said bolt, a helical spring being disposed between said head and said shelf and a depending flange on said shelf adapted to engage said head to prevent rotation of said bolt when said lever is turned manually axially of said bolt whereby to adjust the setting of said additional switch.

3. In a toaster, a circuit including a heating element, a switch comprising a pair of blades each bearing a contact, said blades being biased apart, a manually operable lever adapted to close said switch, a latch biased to engage said lever in a switch closing position thereof, electromagnetic means adapted to pivot said latch out of engagement with said lever when energized, an additional switch comprising a pair of blades each bearing a contact, said blades being biased apart, said additional switch and said electromagnet being in series with said first-named switch, a rod of metal having a relatively high coefficient of heat expansion and responsive to sensible heat in toast which may be toasted in said toaster to close said additional switch when said rod is expanded longitudinally a predetermined amount, said electromagnetic means being adapted to be energized when said first and second switches are closed, a pin assembly including an externally threaded bolt having a head at the lower end thereof, a frame in said toaster having a shelf defining an aperture for receiving said bolt therethrough, a lever having said bolt threadedly received therein at one end thereof and bearing against said shelf to support said bolt, a helical spring disposed between said head and said shelf, a depending flange on said shelf adapted to engage said head to prevent rotation of said bolt when said lever is turned manually axially of said bolt to adjust the setting of said additional switch, a ceramic pin axially secured in the upper end of said bolt in engagement with one of said blades and a set screw threadedly received in said bolt for adjusting the axial position of said pin relative to said bolt in calibrating said switch.

4. In a toaster, a circuit including a heating element, a switch comprising a pair of blades each bearing a contact, said blades being biased apart, a manually operable lever adapted to close said switch, a latch biased to engage said lever in a switch closing position thereof, electromagnetic means adapted to pivot said latch out of engagement with said lever when energized, an additional switch comprising a pair of blades each bearing a contact, said blades being biased apart, said additional switch and said electromagnet being in series with said first-named switch, a rod of metal having a relatively high coefficient of heat expansion and responsive to sensible heat in toast which may be toasted in said toaster and adapted to close said additional switch when said rod is expanded longitudinally a predetermined amount, said electromagnetic means being adapted to be energized when said first and second switches are closed, a pin assembly including an externally threaded bolt having a head at the lower end thereof, a frame in said toaster having a shelf defining an aperture for receiving said bolt therethrough, a lever having said bolt threadedly received therein at one end thereof and bearing against said shelf to support said bolt, a helical spring disposed between said head and said shelf and a depending flange on said shelf adapted to engage said head to prevent rotation of said bolt when said lever is turned manually axially of said bolt to adjust the setting of said additional switch, said toaster having a housing defining a relatively wide slot for affording angular adjustment of said lever manually and for permitting said lever to be turned downwardly by manual pressure thereon whereby to move said bolt upwardly to close said additional switch and release said latch.

5. In a toaster, a circuit including a heating element, a mechanically closable switch in said circuit in series with said heating element, electromagnetic means in said circuit for opening said switch when energized to interrupt said circuit, additional switch means in said circuit in series with said electromagnetc means and said mechanically closable switch and a thermal sensitive member responsive to sensible heat in toast which may be toasted in said toaster for closing said additional switch when said heat has reached a predetermined limit, said electromagnetic means being adapted to be energized upon closing of both of said switches, means for calibrating said additional switch relation to said heat actuated member and means for closing said additional switch manually.

References Cited in the file of this patent

UNITED STATES PATENTS

| | | |
|---|---|---|
| 2,132,622 | Ireland | Oct. 11, 1938 |
| 2,564,321 | Brosseau | Aug. 14, 1951 |
| 2,570,453 | Huck | Oct. 9, 1951 |
| 2,585,885 | White | Feb. 12, 1952 |
| 2,631,523 | Olving | Mar. 17, 1953 |
| 2,655,860 | Smith | Oct. 20, 1953 |
| 2,658,443 | Brace | Nov. 10, 1953 |
| 2,684,427 | Gross | July 20, 1954 |